June 5, 1951        A. N. EMMONS        2,556,137
RADIAL ARM TYPE SAWING DEVICE
Filed Dec. 11, 1946        4 Sheets-Sheet 1
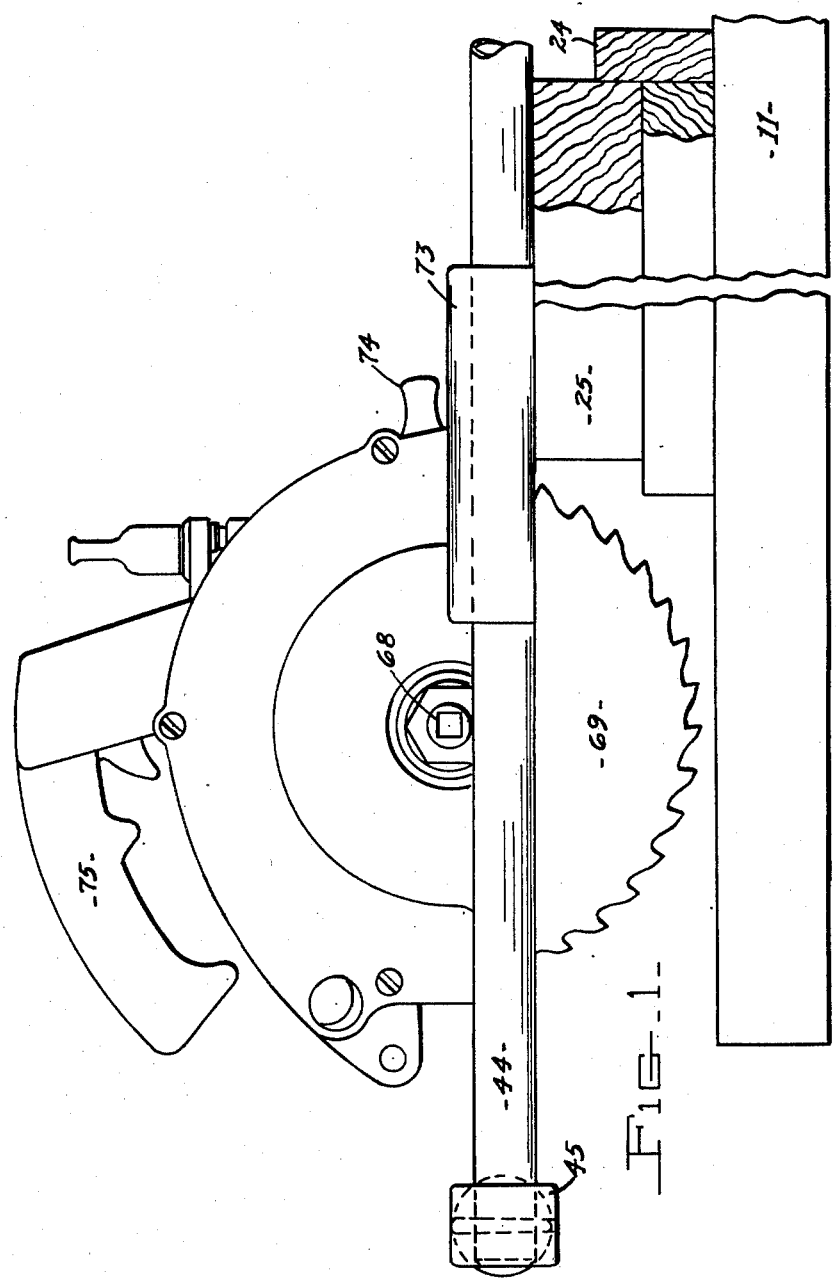
INVENTOR.
Arthur N. Emmons
BY Bodell + Thompson
Attys

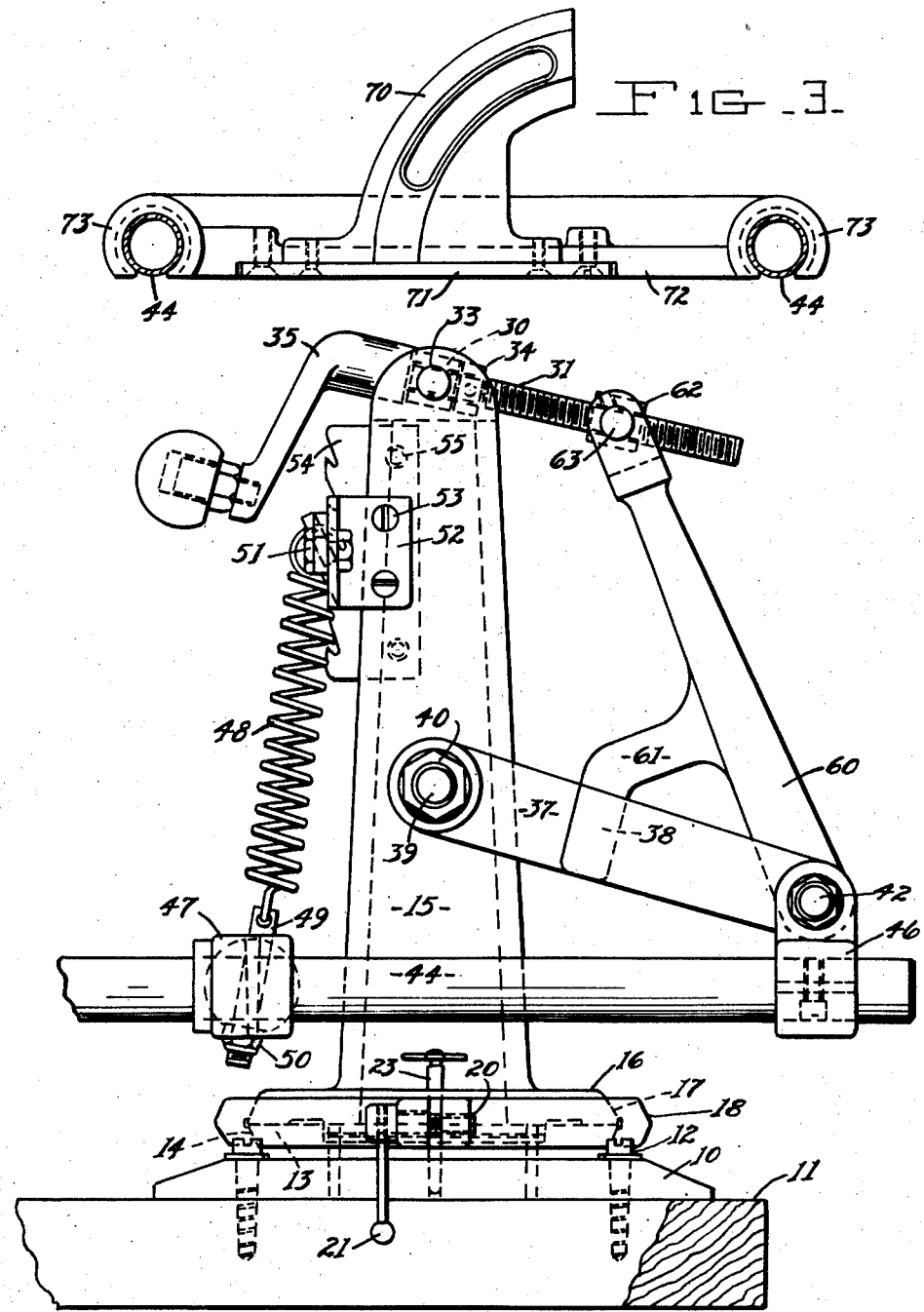

June 5, 1951  A. N. EMMONS  2,556,137
RADIAL ARM TYPE SAWING DEVICE
Filed Dec. 11, 1946  4 Sheets-Sheet 3

INVENTOR.
Arthur N. Emmons
BY Bodell & Thompson
Attys

June 5, 1951  A. N. EMMONS  2,556,137
RADIAL ARM TYPE SAWING DEVICE
Filed Dec. 11, 1946  4 Sheets-Sheet 4

INVENTOR.
Arthur N. Emmons
BY Bodell + Thompson
Attys

Patented June 5, 1951

2,556,137

UNITED STATES PATENT OFFICE 2,556,137

RADIAL ARM TYPE SAWING DEVICE

Arthur N. Emmons, Nedrow, N. Y., assignor to Porter-Cable Machine Company, Syracuse, N. Y., a corporation of New York Application December 11, 1946, Serial No. 715,509

6 Claims. (Cl. 143—6)

This invention relates to a sawing device of the radial arm type. This type of device is mounted on the top surface of a work bench adjacent the rear edge thereof and has a guide, or arm, extending forwardly over the top of the bench and on which a power saw is slidably mounted. The work to be cut is laid on the bench and the power saw is moved laterally across the work, and is accurately guided by the arm, or guide rail, on which the saw is slidably mounted. Usually the guide rail may be moved about a vertical axis to cut work at an angle, and the saw is movable about a horizontal axis, whereby work may be cut at a compound angle.

This invention has as an object a radial arm type sawing device which is particularly economical to manufacture and which, accordingly, can be sold at a price materially lower than the price of such devices now available on the market, and which embodies a structure by which the height of the saw guide from the bench may be quickly and conveniently adjusted by the operator.

The invention consists in the novel features and in the combinations and constructions hereinafter set forth and claimed.

In describing this invention, reference is had to the accompanying drawings in which like characters designate corresponding parts in all the views.

Figures 1 and 1A, joined together, constitute a side elevational view of a sawing device embodying my invention.

Figure 2:
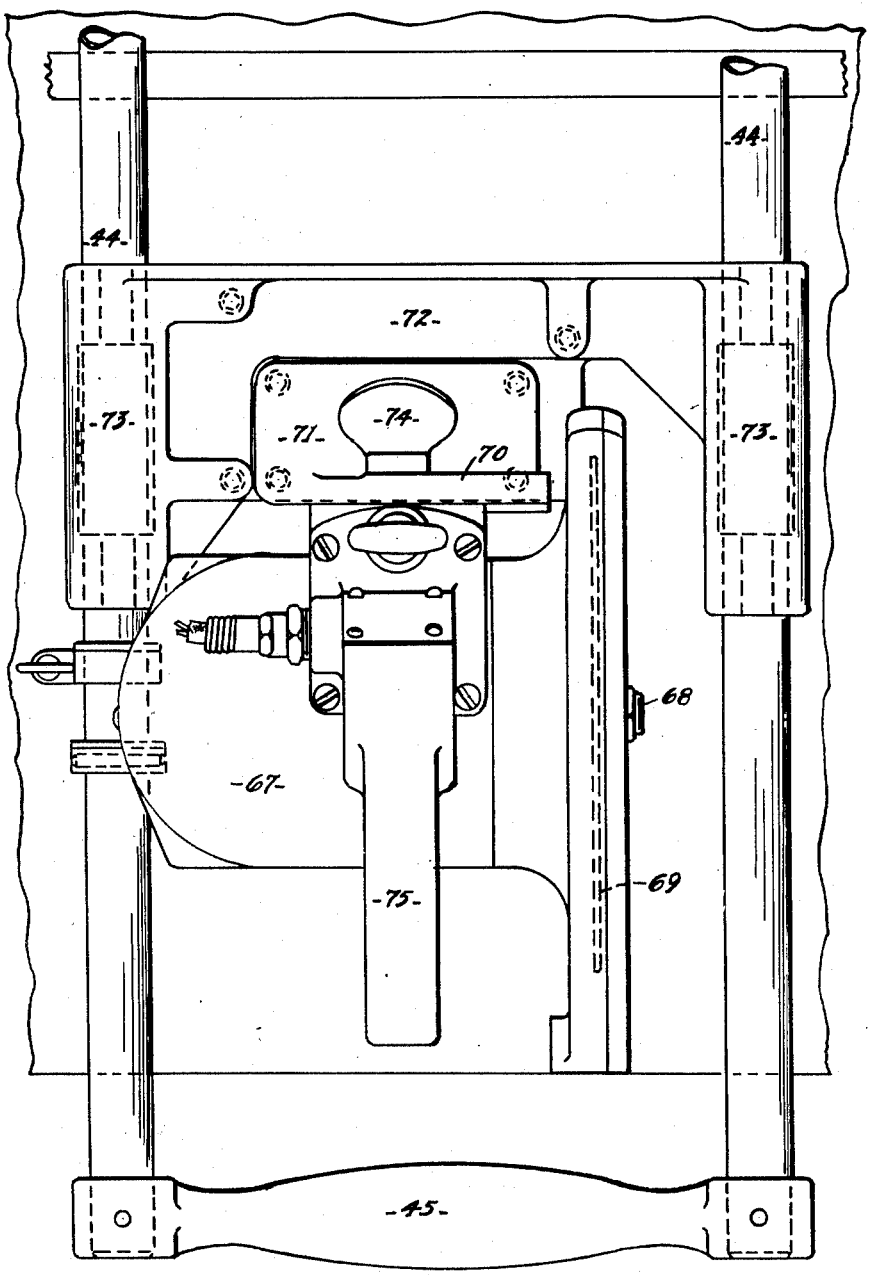
Figure 2A:
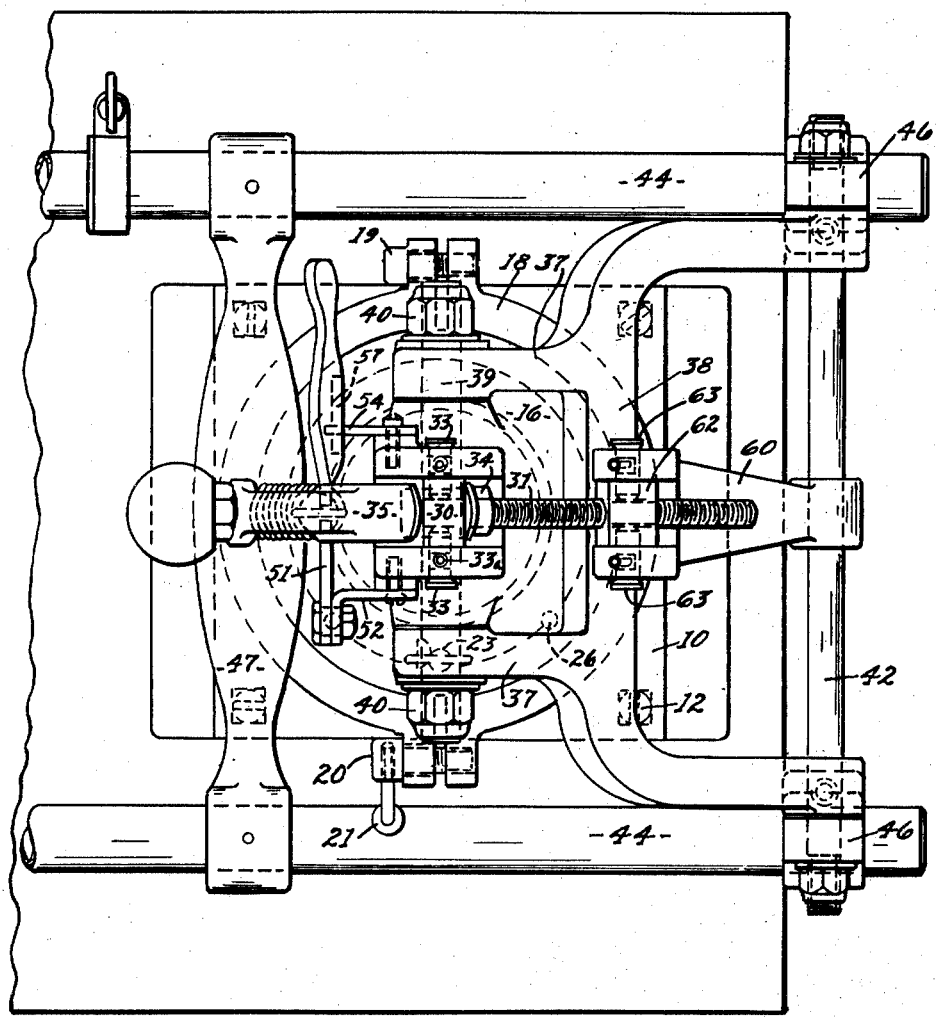

Figures 2 and 2A, joined together, form a top plan view of the structure shown in Figures 1-1A.

Figure 3 is a front elevational view of the power saw supporting carriage.

The device comprises a base 10 of substantially rectangular form and adapted to be mounted upon the top 11 of a bench, or the like, as by means of screws 12. The base is formed with a circular portion 13, the periphery of which is beveled, as indicated at 14.

A support 15 is mounted upon the base and is formed with a circular portion 16, the periphery of which is beveled, as at 17, in the opposite direction to the bevel 14 on the base. The support is adjustably clamped to the base by semi-circular clamp members 18 which encircle the beveled edges 14, 17, of the circular portions 13, 16, of the base and support. The clamp members 18 are contracted into engagement with the circular portions 13, 16, by screws 19 and 20. The screw 20 may be provided with an operating handle 21.

With this construction, the support 15 may be rotated on the base 10 and clamped in any adjusted position by the clamp members 18. The circular portions 13, 16, may be provided with alined tapered apertures to receive a tapered locating pin 23 for quickly locating the support so that the transverse movement of the power saw will be perpendicular to a stop or guide 24 mounted on the bench top 11 and which serves to position the work piece 25. Additional apertures 26 may be provided to position the support so that the movement of the saw will be in angular relation to the work stop 24 to effect angular cuts on the work.

The support 15 is in the nature of an upwardly extending column bifurcated at its upper end to receive a bearing block 30 in which a screw 31 is journalled. The block 30 is journalled on trunnion pins 33 secured in the support. The screw is held against axial movement in the block 30 by a collar 34 secured to the screw on one side of the block, and an operating handle 35 secured to the screw on the opposite side of the block. A bracket is pivotally mounted at one end to the support and extends rearwardly therefrom. The saw guide is pivotally mounted by pin 42 to the rear end of the bracket and is movable about said latter pivot toward and from the bench top 11. The bracket is in the form of a yoke having side members 37 connected intermediate their ends with a transversely extending portion 38. The forward ends of the side members 37 are spaced apart to receive the support column 15, and are apertured to receive a pivot pin 39 extending transversely through the support and held in place by nuts 40 threaded on the ends of the pin.

The rear end portions of the side members 37 are flared outwardly and apertured to receive a pivot pin 42. The saw guide consists of a pair of spaced apart tubular members 44, the outer ends of which are provided with a transversely extending cross member 45 which serves as a convenient handle for raising and lowering the saw guide toward and from the bench.

A bearing member 46 is secured to the inner end of each of the tubes 44, and these bearing members are apertured to receive the pivot pin 42. An additional cross member 47 is secured on the guide rails 44 and is positioned in front of the support 15 and in proximity thereto.

The saw guide is yieldingly urged upwardly from the bench by a tension spring 48, the lower end of which is secured to a pin 49 extending through the cross member 47 and secured thereto as by nut 50. The upper end of the spring is connected to a lever 51 pivotally mounted at one end to an angle bracket 52 secured to one side of the support column, as by screws 53. A notched bracket 54 is secured to the opposite side of the column, as by screws 55. The free end of the lever 51 is inclined slightly and provided with a beveled edge 57 for engaging the notches of the bracket 54, the purpose of the lever 51 being to vary the tension on the spring 48, as will be apparent.

The rail supporting bracket is formed with an arm 60 extending upwardly from the pivot pin 42 and in angular relation to the side members 37 of the bracket, and rigidly secured to the cross member 38 by a projection 61. A nut 62 is journalled in the upper end of the arm 60 on trunnion pins 63. The nut is threaded internally to receive the screw 31, and with this structure the bracket is adjusted about the pivot 39 by operating the crank handle 35 and thus the pivot 42 is raised, or lowered, to adjust the height of the guide rails 44 relative to the bench top 11, this adjustment being made to permit work of different thicknesses to be sawed.

The saw consists of a housing 67 enclosing a motor suitably connected to an arbor 68 on which a saw blade 69 is mounted. The motor housing 67 is supported by an arcuate bracket 70 secured to a plate 71 which, in turn, is secured to a carriage 72. The sides of the carriage are provided with bearings 73 apertured to slidably receive the guide rails 44. The motor housing is adjustable on the arcuate bracket 70 to change the angular relation between the saw arbor 68 and the bench top, and is secured in adjusted position by a thumb screw 74. This structure is more fully disclosed in Patent No. 1,848,330. The motor housing is provided with a suitable handle 75 by which the motor and the carriage 72 is reciprocated on the rails 44.

The structure described is economical to build and light in weight. The height of the guide rails 44 is conveniently adjusted by the operating handle 35, whereby the guide rails are maintained in substantially horizontal position during the sawing operation regardless of the thickness of the work.

The spring 48 maintains the saw guide rails 44 upwardly in spaced relation to the bench top, which permits work to be conveniently placed upon the bench.

In operation, the operator grasps the cross member 45 with one hand and lowers the guide to horizontal position and, with the other hand, moves the saw along the guide transversely of the work. After the sawing operation is completed, the device returns to the upward position by the action of the spring 48.

What I claim is:

1. A sawing device comprising a support adapted to be mounted on a bench and extending upwardly therefrom, a bracket mounted at one end to said support on a horizontal pivot and extending rearwardly therefrom, a saw guide mounted on the rear end of said bracket on a horizontal pivot and extending forwardly over the bench and being movable vertically toward and from the same, manually operable means for moving said bracket about its pivot on said support to adjust said guide pivot vertically, means cooperable with said support and guide to yieldingly urge the guide upwardly from the bench, a carriage slidably mounted on said guide, and a power saw detachably secured to said carriage.

2. A sawing device comprising a support adapted to be mounted on a bench and extending upwardly therefrom, a bracket mounted at one end to said support on a horizontal pivot and extending rearwardly therefrom, said bracket being provided with an upwardly extending arm, and manually operable means cooperable with the support and said arm to move the bracket about its pivot, a saw guide mounted on a horizontal pivot to the rear end of said bracket and extending forwardly of the support and being movable vertically toward and from the bench, means yieldingly urging said guide about its pivot upwardly from the bench, a carriage slidably mounted on the guide, and a power saw detachably secured to said carriage.

3. A sawing device comprising a support adapted to be mounted on a bench top and extending upwardly therefrom, a bracket mounted at one end to said support on a horizontal pivot and extending rearwardly therefrom, a saw guide mounted on the rear end of said bracket on a horizontal pivot and extending forwardly over the bench and being movable vertically toward and from the same, manually operable means for moving said bracket about its pivot on said support to adjust said guide pivot vertically, yielding means cooperable with said guide to urge the same about its pivot upwardly from the bench top, means for adjusting the tension of said yielding means, a carriage slidably mounted on said guide, and a power saw detachably secured to the carriage.

4. A sawing device comprising a support adapted to be mounted on a bench top and extending upwardly therefrom, a bracket mounted at one end on said support on a horizontal pivot in proximity to the bench top and extending rearwardly from said support, a saw guide mounted on the rear end of said bracket on a horizontal pivot and extending forwardly over the bench, said bracket being provided with an upwardly extending arm, screw means cooperable with the upper ends of said support and said arm and being manually operable to move said bracket about its pivot on the support, means yieldingly urging said saw guide about its pivot upwardly from the bench top, a carriage slidably mounted on the guide, and a power saw detachably secured to the carriage.

5. A sawing device comprising a support adapted to be mounted on a bench top and extending upwardly therefrom, a yoke mounted at one end to said support on a horizontal pivot and extending rearwardly therefrom, a pair of guide members secured at their rear ends to the rear end of said yoke on a horizontal pivot and extending forwardly in parallel spaced apart relationship over the bench top, a carriage slidably mounted on said guides, and a power saw detachably secured to said carriage, means yieldingly urging said guides upwardly from the bench top, and manually operable means for moving said yoke about its pivot on said support.

6. A sawing device comprising a support adapted to be mounted on a bench and extending upwardly therefrom, a bracket mounted at one end to said support on a horizontal pivot and extending rearwardly therefrom, manually operable means cooperable with said bracket for moving the same about its pivot on the support, a pair of guide members mounted to the rear end of said bracket on a horizontal pivot and extending forwardly in parallel spaced apart relationship over the bench top, a carriage slidably mounted upon said guide members, a power saw, and means cooperable to detachably secure the front end of said power saw to said carriage.

ARTHUR N. EMMONS.

REFERENCES CITED

The following references are of record in the file of this patent:

UNITED STATES PATENTS

| Number | Name | Date |
|---|---|---|
| 555,649 | Marshall | Mar. 3, 1896 |
| 1,457,492 | Bloodgood | June 5, 1923 |
| 1,529,303 | Drucker | Mar. 10, 1925 |
| 1,836,457 | Emmons | Dec. 15, 1931 |
| 1,843,330 | Emmons | Mar. 8, 1932 |
| 1,852,387 | Wieden | Apr. 5, 1932 |
| 2,306,512 | Whitney | Dec. 29, 1942 |
| 2,367,461 | Emmons | Jan. 16, 1945 |

FOREIGN PATENTS

| Number | Country | Date |
|---|---|---|
| 136,657 | Great Britain | Dec. 23, 1909 |